United States Patent
Woodall et al.

(10) Patent No.: US 6,308,607 B1
(45) Date of Patent: Oct. 30, 2001

(54) NEUTRALIZING MUNITION

(75) Inventors: Robert Woodall, Lynn Haven; Felipe Garcia, Panama City, both of FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/541,835

(22) Filed: Apr. 3, 2000

(51) Int. Cl.⁷ .............................. B64D 1/04; F42B 22/42
(52) U.S. Cl. .......................... 89/1.13; 102/402; 102/403
(58) Field of Search ..................... 89/1.13, 1.11; 102/306, 403, 402, 307, 309, 372, 705, 364

(56) References Cited

U.S. PATENT DOCUMENTS

| | | | |
|---|---|---|---|
| 3,580,171 | * | 5/1971 | Maes . |
| 3,687,076 | * | 8/1972 | Friant et al. . |
| 3,983,818 | * | 10/1976 | Ciccone et al. . |
| 4,353,303 | * | 10/1982 | Bell . |
| 4,436,036 | * | 3/1984 | Bell . |
| 4,478,151 | * | 10/1984 | Vetter et al. . |
| 4,699,061 | * | 10/1987 | Jeffers . |
| 4,920,852 | * | 5/1990 | Miller . |
| 4,955,939 | * | 9/1990 | Petrousky et al. . |
| 5,014,623 | * | 5/1991 | Walker et al. . |
| 5,078,117 | * | 1/1992 | Cover . |
| 5,129,305 | * | 7/1992 | Reilly . |
| 5,223,666 | * | 6/1993 | Delaney, Jr. . |
| 5,415,845 | * | 5/1995 | Brede et al. . |
| 5,686,686 | * | 11/1997 | Woodall, Jr. et al. . |
| 5,728,968 | * | 3/1998 | Buzzett et al. . |
| 5,963,184 | * | 8/1999 | Majerus et al. . |
| 5,970,841 | * | 10/1999 | Trocino . |
| 6,032,567 | * | 3/2000 | Jones et al. . |
| 6,105,505 | * | 8/2000 | Jones . |
| 6,142,056 | * | 11/2000 | Taleyarkhan . |
| 6,209,461 | * | 4/2001 | Riffet et al. . |
| 6,232,519 | * | 5/2001 | Eidelman et al. . |

FOREIGN PATENT DOCUMENTS

| | | | |
|---|---|---|---|
| 78856 | * | 10/1919 | (DE) . |
| 316128 | * | 11/1919 | (DE) . |

* cited by examiner

Primary Examiner—Michael J. Carone
Assistant Examiner—Troy Chambers
(74) Attorney, Agent, or Firm—Harvey A. Gilbert; Donald G. Peck

(57) ABSTRACT

A munition is provided for deploying a molten payload within a target. A plurality of holes are formed in the munition's projectile body about the circumference thereof. A seal closes off each hole. A firing mechanism is mounted in the munition's nose cone and is capable of generating energy of initiation upon deformation of the nose cone. A first burnable material is housed in the projectile body and is coupled to the firing mechanism to receive the energy of initiation. The first burnable material extends in a tree-like fashion along a plurality of connected paths in the projectile body with each of the connected paths terminating at one of the seals. A second burnable material fills the voids in the projectile body surrounding the first burnable material. The first burnable material has a lower threshold of combustion than the second burnable material while the second burnable material burns hotter than the first burnable material.

21 Claims, 1 Drawing Sheet

NEUTRALIZING MUNITION

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to munitions, and more particularly to a munition capable of neutralizing a target while minimizing the probability of an explosive event.

BACKGROUND OF THE INVENTION

Underwater mines are varied in their designs and mechanisms for sensing when detonation should occur. Such sensing systems include mechanical, electrical, acoustic, heat, optical, or other types of sensors. Regardless of the type of mine, underwater mine neutralization typically involves the direct placement of an explosive material on a mine or involves a projectile-delivered explosive that will impact the mine and cause an explosive event. Both of these methods have drawbacks. In terms of direct placement of a bulk explosive, underwater divers must be used to place the explosive directly on a mine. The explosive could be set off prematurely or accidentally and injure/kill the diver. Further, the diver is generally at risk just swimming amongst underwater mines. Still further, whether directly-placed or projectile-delivered, the resulting explosive event signals to an enemy that operations of some sort may be underway. This could compromise the covert nature of a mission.

SUMMARY OF THE INVENTION

Accordingly, it is an object of the present invention to provide a munition that can be directed/delivered to a target for the neutralization thereof without the use of an explosive event.

Another object of the present invention is to provide a munition that can be used to neutralize an underwater mine without endangering personnel.

Still another object of the present invention is to provide a munition that can be used to neutralize an underwater mine without causing the underwater mine to detonate.

Other objects and advantages of the present invention will become more obvious hereinafter in the specification and drawings.

In accordance with the present invention, a munition is provided for deploying a molten payload within a target. The munition has a projectile body with a nose cone. A plurality of holes are formed in the projectile body about a circumference thereof. A seal closes off each hole. A firing mechanism is mounted in the nose cone and is capable of generating energy of initiation upon deformation of the nose cone. A first burnable material is housed in the projectile body and is coupled to the firing mechanism to receive the energy of initiation. The first burnable material extends in a tree-like fashion along a plurality of connected paths in the projectile body with each of the connected paths terminating at one of the seals. Voids are formed in the projectile body around the connected paths. A second burnable material fills the voids in the projectile body. The first burnable material has a lower threshold of combustion than the second burnable material. Upon impacting a target, deformation of the nose cone activates the firing mechanism. As a result, the energy of initiation is applied to the first burnable material which burns quickly along the connected paths and causes the failure of the seals. The heat generated by the burning of the first burnable material ignites the second burnable material which, in turn, becomes molten and flows out of the unsealed holes in the projectile body.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
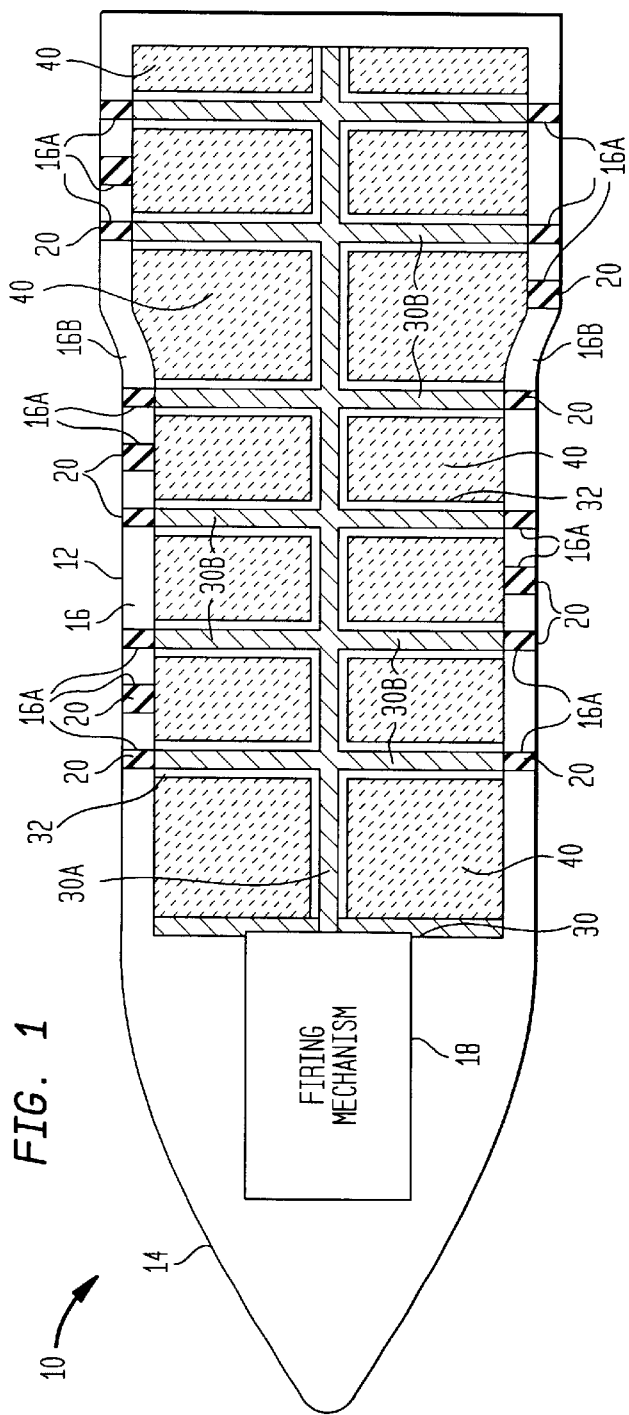
FIG. 1 is a cross-sectional schematic view of one embodiment of a munition that can deploy a molten pyrotechnic payload within a target in accordance with the present invention.

Referring now to the drawings, and more particularly to FIG. 1, a munition that can deploy a molten payload within a target is shown schematically and referenced generally by numeral 10. Munition 10 can be used to neutralize (i.e., render the target inoperable) a variety of targets. For example, such targets can include underwater mines, vehicles, facilities, electronic equipment, or any other target that can be rendered useless by the deposition of a molten pyrotechnic material therein. In terms of an underwater target, munition 10 can be launched using, for example, the launcher disclosed in U.S. Pat. No. 5,686,686.

Munition 10 has an outer body 12 shaped like a projectile, the particular shape of which is not a limitation of the present invention. Projectile body 12 has a nose cone 14 and a casing 16 aft of and adjoining nose cone 14. Nose cone 14 houses a firing mechanism 18 that will initiate reactions within casing 16 as will be described further below. Firing mechanism 18 can be of any suitable design that supplies an energy of initiation when munition 10 embeds itself in a target. Typically, firing mechanism 18 will be triggered upon the deformation of nose cone 14. Since nose cone 14 will generally be made from a heavy metal (e.g., titanium, tungsten, depleted uranium, stainless steel, etc.) so that it can puncture a target upon impact therewith. The use of a heavy metal also prevents inadvertent activation of firing mechanism 18 as routine mishandling of munition 10 will not bring about sufficient deformation of nose cone 14 to initiate firing mechanism 18.

A number of holes 16A are formed about the circumference of casing 16. While the size of holes 16A is not a limitation of the present invention, holes 16A typically are on the order of approximately 0.25 inches. Each of holes 16A is sealed with a seal or plug 20 that will fail (e.g., melt, break, etc.) at the appropriate time as will be explained further below. Each seal 20 serves as a moisture seal and can be a soft meltable plastic or wax, a piece of foil or other suitable sealing material.

Coupled to firing mechanism 18 is a burnable material 30 that extends from firing mechanism 18 in a tree-like structure to define a plurality of connected paths. By way of example, burnable material 30 has a central trunk portion 30A extending axially within and along the length of casing 16. A plurality of branch portions 30B of burnable material 30 extend radially outward from trunk portion 30A to a hole 16A closed off by a seal 20. Note that not all of holes 16A need to have a branch portion 30A leading thereto although this will generally be the case. Branch portions 30B need not extend perpendicularly from trunk portion 30A, but could also be at an angle thereto. Both of trunk portion 30A and branch portions 30B need not define straight paths as shown, but could be curved. Still further, more than one of trunk portion 30A could extend the length of casing 16.

The spaces or voids formed about burnable material 30 within casing 16 is filled with another burnable material 40. Relative to burnable material 30, burnable material 40 has a higher threshold of combustion and burns at higher temperature than burnable material 30. That is, material 30 will combust more readily than material 40 but, once ignited to its molten state, material 40 attains higher temperatures than a burning form of material 30.

The interior configuration of burnable material 30 and burnable material 40 can be achieved in a variety of ways. For example, tubes 32 defining the tree-like structure of burnable material 30 can be filled and placed (or placed and filled) within casing 16. Tubes 32 could be made from a material (e.g., cardboard, plastic, etc.) that burns or melts easily when burnable material 30 is burning. With filled tubes 32 in place, burnable material 40 can be added to casing 16 to fill up the spaces and tubes 32. Another way to achieve the interior configuration of burnable materials 30 and 40 is to first fill casing 16 with burnable material 40, and then bore out burnable material 40 to define the desired tree-like structure for burnable material 30. The bored out portion of burnable material 40 is then filled with a slurry of burnable material 30. In this construction, no tubes 32 would be required.

In operation, munition 10 is launched towards a target (not shown). Upon impacting the target, nose cone 14 penetrates an outer wall of the target, begins to deform, and pulls casing 16 inside the target. Since most mines today are equipped with sensor(s) that are designed to prevent detonation due a brief sudden impact (e.g., bumping by a fish or a speedboat, or impact by munition 10), munition 10 will typically be able to penetrate a mine without detonating it. To assure that munition 10 does not just pass through the target, casing 16 can be flared outward at some portion thereof to define a larger outer diameter. For example, in the illustrated embodiment, casing 16 flares radially outward at a step 16B. However, it is to be understood that this is not the only construction for casing 16. Such flaring could also occur continuously along the length of casing 16. obviously, such flaring should not negatively impact the ballistic nature of munition 10.

Deformation of nose cone 14 activates firing mechanism 18 which, in turn, supplies an energy of initiation to burnable material 30 to bring about two results. First, burnable material 30 burns quickly along its trunk portion 30A and branch portions 30B causing the failure (e.g., melting) of seals 20. Second, the heat generated by the burning of burnable material 30 ignites burnable material 40 throughout casing 16. As burnable material 40 becomes molten and pressurized due to thermal expansion, it flows out of any of holes 16A aligned with burnable material 30, as well as any of holes 16A aligned with burnable material 40 whose seals 20 will fail as burnable material 40 becomes molten.

Material(s) selected for burnable material 40 will dictate the temperature thereof in its molten state, how the material will flow out of casing 16 in its molten state, and the choice of burnable material 30. Several examples will be provided herein. However, it is to be understood that other material selections can be made without departing from the scope of the present invention.

Regardless of the type of molten flow desired, a good choice for burnable material 40 is thermite which, in general, is a mixture of aluminum and ferrous oxide. If it is desired to provide a continuous flow of (molten) burnable material 40 from casing 16, burnable material 40 could be selected from a variety of well known thermite compounds such as thermite TH3 (66.8% aluminum/iron oxide, 29.00% barium nitrate, 2.00% sulfur and a percentage of binder). Other thermite compounds that can be used in the present invention include, but are not limited to, a thermite compound that includes a copolymer of vinylidene fluoride and hexafluoroporpylene as disclosed in U.S. Pat. No. 4,432,816, or a thermite compound that includes metallic fuels and halopolymeric binders like polytetrafluroethylene as disclosed in U.S. Pat. No. 4,349,396.

In other applications, it may be desirable to create a turbulent or chuffing flow of (molten) burnable material 40. That is, (molten) burnable material 40 is forced out of holes 16A turbulently in a jet-like fashion. To achieve this, burnable material 40 is a high-temperature burning material (e.g,. a thermite compound) with energetic or explosive material homogeneously dispersed therein. The explosive material could be in the form of powder, solid particles, or hollow particles or pellets. Suitable explosive materials include, but are not limited to, TNT including specific military compositions such as PENTOLITE, RDX including specific military composition such as various HBX compositions, and HMX including specific military compositions such as OCTOL. The explosive material can be of any shape/size as needed to increase or reduce its burning rate and/or transition from burning to deflagration and/or detonation depending on the burning temperature of the burning material (e.g., thermite compound) and cook-off temperature of the explosive material.

The amount of explosive material dispersed in the burning material (e.g., thermite compound) can be varied based on the type of chuffing reaction desired. In terms of burning materials selected from thermite compounds, the weight percent of explosive material used to make the burnable material 40 could be as high as 80%. The actual weight percent of explosive material depends on a variety of factors such as the choice of explosive, percentage of voids in the material mixture, pressure developed in the material as it is being loaded/packed into casing 16, and the operation pressure and temperature of the material as it burns.

The choice of burnable material 30 can also be varied without departing from the scope of the present invention. By way of example, if burnable material 40 is a thermite compound, or a mixture of a thermite compound and explosive material as described above, burnable material 30 could be any well known thermite ignition mix. One such thermite ignition mix is made from the following constituent components (or suitable facsimiles as known in the art of thermite ignition mixes):

| | |
|---|---|
| Potassium Nitrate | 66.89% by weight |
| Titanium | 14.96% |
| Silicon | 7.78% |
| Aluminum | 8.67% |
| Binder | 1.70% |

If it is necessary to make burnable material 30 in the form of a slurry, a variety of well established practices can be used. For example, a slurry could be made using the above-recited thermite ignition mix by adding eight percent by weight of nitrocellulose to acetone, and then mixing twenty grams of the acetone/nitrocellulose solution with fifteen grams of the above-recited thermite ignition mix.

Figure 2:
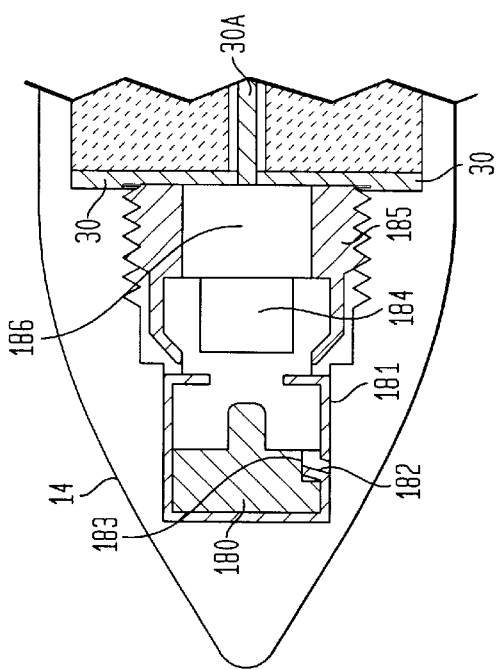
FIG. 2 is a cross-sectional view of an embodiment of a firing mechanism that can be used in the munition of the present invention.

As mentioned above, a variety of designs could be used for firing mechanism 18 without departing from the scope of the present. By way of example, one suitable firing mechanism 18 is illustrated in FIG. 2. A firing pin 180 is housed within a retainer housing 181 having, for example, a retaining clip 182 cooperating with a detent 183 on firing pin 180. Clip 182/detent 183 prevent the inadvertent activation of firing mechanism 18. A primer 184 (such as military primer M42C2) is adjacent housing 181 and maintained within a primer and ignition holder 185. Adjacent primer 184 within holder 185 is any igniter 186 (such as IGNITER 212 described on U.S. Navy Drawing DWG 2518212) which, in turn, is in contact with burnable material 30. At target impact, nose cone 14 deforms and causes firing pin 180 to impact primer 184 as clip 182 fails. Note that the requirement that nose cone 14 be deformed prior to initiation of firing mechanism 18 provides for the penetration of nose cone 14 into the target prior to full activation of firing mechanism 18. This insures that munition 10 is substantially in the target prior to the deployment of (molten) burnable material 40. The impact of firing pin 180 on primer 184 initiates igniter 186 to start the burning of burnable material 30 along its defined paths as described above.

The advantages of the present invention are numerous. The munition can be used to neutralize an underwater mine or other target without any explosive event thereby increasing the chance for mission covertness. The munition can be remotely directed and launched towards its target thereby keeping personnel out of harms way. The present invention is lightweight and can be used on land or underwater. The munition can be constructed to provide a continuous flow or a chuffing flow of molten material.

Although the invention has been described relative to a specific embodiment thereof, there are numerous variations and modifications that will be readily apparent to those skilled in the art in light of the above teachings. For example, as mentioned above, energy of initiation for igniting burnable material 30 could come from a variety of mechanisms such as percussion primers, squibs, exploding bridge wires, a shock tube, exploding foil initiators, an underwater timing fuse, etc. The choice of burnable materials 30 and 40 can be different from those described herein without departing from the novelty of the present invention. It is therefore to be understood that, within the scope of the appended claims, the invention may be practiced other than as specifically described.

What is claimed as new and desired to be secured by Letters Patent of the United States is:

1. A munition for deploying a molten payload within a target, comprising:
    a projectile body having a nose cone, said projectile body having a plurality of holes formed therethrough about a circumference thereof;
    a seal for closing off each of said plurality of holes;
    a firing mechanism mounted in said nose cone for generating energy of initiation upon deformation of said nose cone;
    a first burnable material housed in said projectile body and coupled to said firing mechanism to receive said energy of initiation, said first burnable material extending in a tree-like fashion along a plurality of connected paths in said projectile body, each of said plurality of connected paths terminating at one said seal, wherein voids are formed in said projectile body around said plurality of connected paths;
    a second burnable material filling said voids in said projectile body; and
    said first burnable material having a lower threshold of combustion than said second burnable material.

2. A munition as in claim 1 wherein said projectile body flares radially outward at a portion thereof aft of said nose cone.

3. A munition as in claim 1 wherein said second burnable material is a thermite compound.

4. A munition as in claim 1 wherein said second burnable material is a thermite compound having an explosive material dispersed therein.

5. A munition as in claim 4 wherein said explosive material is in a form selected from the group consisting of powder, particles, solid pellets and hollow pellets.

6. A munition as in claim 4 wherein a mixture is formed by said explosive material dispersed in said thermite compound, said mixture comprising up to approximately 80% by weight of said explosive material.

7. A munition as in claim 1 wherein said plurality of connected paths comprises:
    at least one trunk path extending from said firing mechanism to an aft portion of said projectile body; and
    a plurality of branch paths coupled to said trunk path with each of said plurality of branch paths terminating at one said seal.

8. A munition as in claim 1 wherein said nose cone is made from a material selected from the group consisting of titanium, tungsten, depleted uranium and stainless steel.

9. A munition as in claim 1 further comprising tubes defining said plurality of connected paths wherein said first burnable material is housed in said tubes prior to receiving said energy of initiation.

10. A munition as in claim 1 wherein said second burnable material has an explosive material dispersed therein.

11. A munition as in claim 10 wherein said explosive material is in a form selected from the group consisting of powder, particles, solid pellets and hollow pellets.

12. A munition as in claim 1 wherein said seal comprises a material that fails when said first burnable material burns in response to said energy of initiation.

13. A munition for deploying a molten payload within a target, comprising:
    a projectile body having a nose cone, said projectile body expanding in diameter aft of said nose cone, said projectile body having a plurality of holes formed therethrough about a circumference thereof;
    a seal for closing off each of said plurality of holes, each said seal made from a meltable material;
    a firing mechanism mounted in said nose cone for generating energy of initiation upon deformation of said nose cone;
    a first burnable material housed in said projectile body and coupled to said firing mechanism to receive said energy of initiation, said first burnable material extending in a tree-like structure having a trunk path and a plurality of branch paths connected to said trunk path, each of said plurality of branch paths extending radially outward from said trunk path to one said seal, wherein voids are formed in said projectile body around said trunk path and said plurality of branch paths;

a second burnable material filling said voids in said projectile body; and said first burnable material having a lower threshold of combustion than said second burnable material.

14. A munition as in claim 13 wherein said second burnable material has an explosive material dispersed therein.

15. A munition as in claim 14 wherein said explosive material is in a form selected from the group consisting of powder, particles, solid pellets and hollow pellets.

16. A munition as in claim 13 wherein said second burnable material is a thermite compound.

17. A munition as in claim 16 wherein said second burnable material is a thermite compound having an explosive material dispersed therein.

18. A munition as in claim 17 wherein said explosive material is in a form selected from the group consisting of powder, particles, solid pellets and hollow pellets.

19. A munition as in claim 17 wherein a mixture is formed by said explosive material dispersed in said thermite compound, said mixture comprising up to approximately 80% by weight of said explosive material.

20. A munition as in claim 13 wherein said nose cone is made from a material selected from the group consisting of titanium, tungsten, depleted uranium and stainless steel.

21. A munition as in claim 13 further comprising tubes defining said plurality of connected paths wherein said first burnable material is housed in said tubes prior to receiving said energy of initiation.

* * * * *